US010650156B2

(12) United States Patent
Anderson et al.

(10) Patent No.: US 10,650,156 B2
(45) Date of Patent: May 12, 2020

(54) ENVIRONMENTAL SECURITY CONTROLS TO PREVENT UNAUTHORIZED ACCESS TO FILES, PROGRAMS, AND OBJECTS

(71) Applicant: International Business Machines Corporation, Armonk, NY (US)

(72) Inventors: Mark J. Anderson, Oronoco, MN (US); Scott Forstie, Rochester, MN (US); Jeffrey M. Uehling, Saint Charles, MO (US)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 15/498,115

(22) Filed: Apr. 26, 2017

(65) Prior Publication Data

US 2018/0314845 A1    Nov. 1, 2018

(51) Int. Cl.
*G06F 21/62* (2013.01)
*G06F 21/60* (2013.01)
(Continued)

(52) U.S. Cl.
CPC ............ *G06F 21/6218* (2013.01); *G06F 8/61* (2013.01); *G06F 21/32* (2013.01); *G06F 21/604* (2013.01);
(Continued)

(58) Field of Classification Search
CPC ...... G06F 21/60; G06F 21/62; G06F 21/6218; G06F 21/00; H04L 63/00; H04L 63/10; H04L 63/101; H04L 63/102
See application file for complete search history.

(56) References Cited

U.S. PATENT DOCUMENTS

| 4,087,856 A | 5/1978 | Attanasio |
| 5,887,189 A | 3/1999 | Birns |

(Continued)

FOREIGN PATENT DOCUMENTS

| WO | 2012135192 | 10/2012 |
| WO | 2015038944 A1 | 3/2015 |

OTHER PUBLICATIONS

Axelsson et al. "Approach to UNIX security logging." Published in Proceedings of the 21st National Information Systems Security Conference, pp. 62-75, Oct. 5-8, Crystal City, Arlington, VA, USA, 1998 (Related).

(Continued)

*Primary Examiner* — Daniel B Potratz
*Assistant Examiner* — D'Arcy Winston Straub
(74) *Attorney, Agent, or Firm* — Patterson + Sheridan, LLP

(57) ABSTRACT

Systems, methods, and computer program products to perform an operation comprising receiving, from an application executing on a system, a request to access a data file, receiving data describing the request, wherein the data describing the request includes data from a runtime stack of the application, wherein the data from the runtime stack includes a program statement number, identifying, in a protected memory block, a first rule for accessing the data file, wherein the first rule specifies a program statement number permitted to access the data file, and upon determining that the program statement number from the runtime stack does not match the program statement number specified in the first rule, restricting access to the data file by the application.

20 Claims, 9 Drawing Sheets

(51) Int. Cl.
   *G06F 21/32*   (2013.01)
   *G06F 8/61*    (2018.01)
   *H04L 29/06*   (2006.01)

(52) U.S. Cl.
   CPC ............ *H04L 63/10* (2013.01); *H04L 63/101* (2013.01); *H04L 63/102* (2013.01)

(56) References Cited

U.S. PATENT DOCUMENTS

| | | | |
|---|---|---|---|
| 6,125,447 A * | 9/2000 | Gong ................ | G06F 9/468 713/154 |
| 6,138,238 A * | 10/2000 | Scheifler ............ | G06F 9/4411 726/17 |
| 6,233,576 B1 | 5/2001 | Lewis | |
| 6,711,687 B1 | 3/2004 | Sekiguchi | |
| 6,904,513 B1 | 6/2005 | Tormey et al. | |
| 7,669,238 B2 * | 2/2010 | Fee ................ | G06F 21/51 380/29 |
| 8,010,772 B2 | 8/2011 | Kershaw et al. | |
| 8,271,780 B2 | 9/2012 | Xiao et al. | |
| 8,413,247 B2 | 4/2013 | Hudis et al. | |
| 8,612,590 B1 | 12/2013 | Chaddha | |
| 8,677,501 B2 | 3/2014 | Fujishima et al. | |
| 9,122,890 B2 | 9/2015 | Grocutt et al. | |
| 9,152,778 B2 | 10/2015 | Perlman et al. | |
| 9,674,194 B1 | 6/2017 | McClintock | |
| 9,830,469 B1 | 11/2017 | Anderson et al. | |
| 9,928,365 B1 | 3/2018 | Anderson et al. | |
| 10,346,625 B2 | 7/2019 | Anderson et al. | |
| 2002/0120919 A1 | 8/2002 | Aizenbud-Reshef | |
| 2003/0041267 A1 | 2/2003 | Fee | |
| 2003/0159069 A1 | 8/2003 | Choi et al. | |
| 2004/0158711 A1 | 8/2004 | Zimmer | |
| 2004/0181788 A1 | 9/2004 | Kester et al. | |
| 2005/0044399 A1 | 2/2005 | Dorey | |
| 2005/0108206 A1 | 5/2005 | Lam | |
| 2005/0223220 A1 | 10/2005 | Campbell | |
| 2006/0037082 A1 | 2/2006 | LaMacchia et al. | |
| 2006/0101413 A1 | 5/2006 | Kinno | |
| 2006/0225134 A1 | 10/2006 | Conti | |
| 2007/0029358 A1 | 2/2007 | Jacobs | |
| 2007/0079358 A1 | 4/2007 | Lambert et al. | |
| 2007/0180541 A1 * | 8/2007 | Shu ................ | G06F 9/3001 726/34 |
| 2008/0005782 A1 | 1/2008 | Aziz | |
| 2008/0244694 A1 | 10/2008 | Neystadt et al. | |
| 2008/0288926 A1 | 11/2008 | Cain, III | |
| 2009/0064218 A1 | 3/2009 | Yamagishi | |
| 2009/0282457 A1 | 11/2009 | Govindavajhala | |
| 2009/0300532 A1 | 12/2009 | Cowan | |
| 2010/0017742 A1 | 1/2010 | Rhodes | |
| 2010/0023522 A1 | 1/2010 | Madathilparambil George et al. | |
| 2010/0223570 A1 | 9/2010 | Gerstl et al. | |
| 2011/0153560 A1 | 6/2011 | Bryant | |
| 2012/0047580 A1 | 2/2012 | Smith | |
| 2012/0198569 A1 | 8/2012 | Halas | |
| 2012/0233216 A1 | 9/2012 | Lim | |
| 2012/0254946 A1 | 10/2012 | Fleischman et al. | |
| 2012/0294146 A1 | 11/2012 | Wu | |
| 2012/0297485 A1 * | 11/2012 | Maeda ................ | G06F 21/52 726/23 |
| 2013/0036464 A1 | 2/2013 | Glew et al. | |
| 2013/0081134 A1 | 3/2013 | Glew | |
| 2013/0111167 A1 | 5/2013 | Lih | |
| 2013/0198823 A1 * | 8/2013 | Hitchcock ............ | G06F 21/41 726/6 |
| 2014/0096245 A1 | 4/2014 | Fischer | |
| 2015/0199770 A1 | 7/2015 | Wallenstein | |
| 2015/0248341 A1 | 9/2015 | Cabrera | |
| 2015/0379290 A1 | 12/2015 | Shinke et al. | |
| 2016/0062817 A1 | 3/2016 | Young et al. | |
| 2016/0065554 A1 | 3/2016 | Brown | |
| 2016/0350019 A1 | 12/2016 | Koufaty et al. | |
| 2016/0357958 A1 | 12/2016 | Guidry | |
| 2017/0111368 A1 | 4/2017 | Hibbert | |
| 2017/0177368 A1 | 6/2017 | DeHon | |
| 2017/0180403 A1 | 6/2017 | Mehta | |
| 2017/0359284 A1 | 12/2017 | Sudduth | |

OTHER PUBLICATIONS

Bhagat et al., "An Analysis on Cloud Data Security and Accountability." International Journal of Current Engineering and Technology 1.4 (2014): 2464-2467. {Background}.

Gaifang, "The Development of Logging Large-scale Management Information System" Challenges in Environmental Science and Computer Engineering {CESCE}, 2010 International Conference on. vol. 2. IEEE, 2010. {Related}.

Linux Security Howto, "Files and File System Security," [Available Online], http://www.tldp.org/HOWTO/Security-HOWTO/file-security.html, [Accessed on Mar. 15, 2017], pp. 1-7.

International Business Machines Corporation, "List of IBM Patents or Patent Applications Treated as Related," as filed on Apr. 26, 2017.

ultimatewindowssecurity.com, "Special Privileges Assigned to New Logon," [Available Online], detecting security incidents using windows workstation event logs, pp. 1-2 [Accessed Mar. 15, 2017].

OWASP, Logging Cheat Sheet, https:/lwww.owasp.org/index.php/Logging_Cheat_Sheet, Jan. 20, 2016, pp. 1-12.

Python, "Psutil 5.2.0: Phyton Package Index," [Available Online], https://pypi.python.org/pypi/psutil, pp. 1-5 [Accessed Mar. 15, 2017].

Smalley, "RE: User File Access Auditing," Oct. 22, 2004, [Available Online] http://www.redhat.com/archives/fedora-selinux-list/2004-October/msg00125.html [Accessed on Mar. 15, 2017].

SANS Institute InfoSec Reading Room, "Detecting Security Incidents Using Windows Workstation Event Logs," Accepted Jun. 19, 2013, pp. 1-35.

wikipedia.org, "Security Log," [Available Online] [Page modified on Jun. 29, 2016] https://en.wikipedia.org/wiki/Security_log, pp. 1 [Accessed on Mar. 15, 2017].

Gentoo linux, "SELinux/Quick introduction," [Available Online] [Page Modified on Jan. 13, 2015], https://wiki.gentoo.org/wiki/SELinux/Quick_introduction [Accessed on Mar. 15, 2017] pp. 1-15.

Singh, "An experiment in software component retrieval based on metadata and ontology repository, " International Journal of Computer Applications 61.14 (2013). (Background).

Gite, Linux Audit Files to see who made changes to a file, Bitbucket, Jun. 21, 2016, pp. 1-22.

SELinux/Tutorials/Whre to find SELinux permission denial details—Gentoo Wiki, https://wiki.gentoo.org/wiki/SELinux/Tutorials/Where_to_find_SELinux_Permission_denial_details, pp. 1-10.

Developers, "Requesting Permissions at Run Time," [Available Online] https://developer.android.com/training/permissions/requesting.html, [Accessed Mar. 15, 2017], pp. 1-5.

Chalmers University of Technology, "Log-Based Anomaly Detection for System Surveillance," Cecilia Geijer and Josefina Anderson, 2015, pp. 1-71.

"Windows Incident Response" [Available Online] http://windowsir.blogspot.com/2013/07/howto-determine-user-access-to-files.html, Jul. 8, 2013, [Accessed Mar. 15, 2017] pp. 1-5.

SearchSecurity, "An Inside Look at Security Log Management Forensics Investigations," [Available Online], http://searchsecurity.techtarget.com/tip/An-inside-look-at-security-log-management-forensics-investigations, [Accessed on Mar. 15, 2017] pp. 1-12.

Logentries.com "Automated Anomaly Detection," [Available Online], https://logentries.com/product/anomaly-detection/ [Accessed on Mar. 15, 2017] pp. 1-3.

U.S. Appl. No. 15/339,664, entitled "Automated Mechanism to Obtain Detailed Forensic Analysis of File Access,", filed Oct. 31, 2016.

U.S. Appl. No. 15/339,675, entitled "Automated Mechanism to Analyze Elevated Authority Usage and Capability,", filed Oct. 31, 2016.

Suh et al. "Secure program execution via dynamic information flow tracking." Acm Sigplan Notices. vol. 39. No. 11. ACM, 2004.

Saal et al., "Secure program execution via dynamic information flow tracking." Acm Sigplan Notices. vol. 39. No. 11. ACM, 2004.

(56) References Cited

OTHER PUBLICATIONS

Bugiel et al. "Towards Taming Privilege-Escalation Attacks on Android." NDSS. vol. 17. 2012.

Dunn, Enforcing Application-level Security in Modem Operating Systems. Technical Report. Washington: University of Washington, 2004.

IBM, "List of IBM Patents or Patent Applications Treated as Related," for U.S. Appl. No. 15/498,115, filed Apr. 26, 2017.

* cited by examiner

| USER_NAME 301 | OBJECT_NAME 302 | LIBRARY_NAME 303 | OBJECT_TYPE 304 | MOST_RECENT_USER_PROGRAM 305 | STATEMENT_NUMBER 306 | MOST_RECENT_PROGRAM 307 | STATEMENT_NUMBER 308 |
|---|---|---|---|---|---|---|---|
| FRED1 | DSPPFM | QSYS | *CMD | USERPGM1 | 12 | QCARULE | 97 |
| FRED1 | CALL | QSYS | *CMD | - | - | QCARULE | 97 |
| FRED1 | SENSITIVE1 | QGPL | *FILE | USERPGM1 | 12 | QNFBROWS | 86 |
| FRED1 | SENSITIVE1 | QGPL | *FILE | USERPGM1 | 12 | QDBOPEN | 14653 |
| FRED1 | QDNFBRWS | QSYS | *FILE | USERPGM1 | 12 | QDMCOPEN | 1416 |
| FRED1 | QGPL | QSYS | *LIB | USERPGM1 | 12 | QDMCOPEN | 803 |
| FRED1 | USERPGM1 | QGPL | *PGM | - | - | QCACLL | 72 |
| FRED1 | USERPGM1 | QGPL | *PGM | USERPGM1 | 4 | QLIADOPT | 3 |

FIG. 3A

ENVIRONMENTAL SECURITY CONTROLS TO PREVENT UNAUTHORIZED ACCESS TO FILES, PROGRAMS, AND OBJECTS

BACKGROUND

The present disclosure relates to computer security, and more specifically, to providing environmental security controls to prevent unauthorized access to files, programs, and objects.

Conventional operating systems may deploy a discretionary or mandatory access control security system. However, such systems cannot prevent a root level user (e.g., a security officer or administrator) from accessing data or applications given that this user has full authority to every file, program, and object on the system. Thus, if a user gains access to the system and gains root level privileges, this user now has full access to every file, program and object on the system. This leaves all sensitive data at risk from both users with a root level user ID and the user who gains root level privilege.

Conventional techniques to add security on top of the operating system and/or system microcode do not provide acceptable solutions. For example, techniques to prevent the use of certain interfaces used to access data on the system may add "exit" related programs that may analyze the run-time environment and prevent access. An example of such an exit program tests the Internet Protocol (IP) Address of the user attempting access and then either allows or prevents this user from accessing the file. Another example of an exit program analyzes the time-of-day may to allow access between 8:00 a.m. and 5:00 p.m., but disallow accesses attempted outside of this time range. However, the techniques can easily be defeated by a root level user. For example, the root level user can remove the exit programs that are controlling access, or change the parameters being checked (such as allowing access from 5:00 p.m.-8:00 a.m.). In addition, systems that enforce mandatory access control security assign a classification to each data file, such as "top secret," which can only be accessed by a user with the corresponding "top secret" clearance. Such security fails if a user without the required clearance is able to gain access to a user account with the required clearance, as these users are allowed to create new users or change classification values (e.g., re-classify a "top secret" file to "unsecured").

SUMMARY

In one embodiment, a method comprises receiving, from an application executing on a system, a request to access a data file, receiving data describing the request, wherein the data describing the request includes data from a runtime stack of the application, wherein the data from the runtime stack includes a program statement number, identifying, in a protected memory block, a first rule for accessing the data file, wherein the first rule specifies a program statement number permitted to access the data file, and upon determining that the program statement number from the runtime stack does not match the program statement number specified in the first rule, restricting access to the data file by the application.

In another embodiment, a system comprises a processor and a memory storing instructions, which when executed by the processor, performs an operation comprising receiving, from an application executing on a system, a request to access a data file, receiving data describing the request, wherein the data describing the request includes data from a runtime stack of the application, wherein the data from the runtime stack includes a program statement number, identifying, in a protected memory block, a first rule for accessing the data file, wherein the first rule specifies a program statement number permitted to access the data file, and upon determining that the program statement number from the runtime stack does not match the program statement number specified in the first rule, restricting access to the data file by the application.

In another embodiment, a computer-readable storage medium has computer-readable program code embodied therewith, the computer-readable program code executable by a processor to perform an operation comprising receiving, from an application executing on a system, a request to access a data file, receiving data describing the request, wherein the data describing the request includes data from a runtime stack of the application, wherein the data from the runtime stack includes a program statement number, identifying, in a protected memory block, a first rule for accessing the data file, wherein the first rule specifies a program statement number permitted to access the data file, and upon determining that the program statement number from the runtime stack does not match the program statement number specified in the first rule, restricting access to the data file by the application.

BRIEF DESCRIPTION OF THE SEVERAL VIEWS OF THE DRAWINGS

FIGS. 3A-3B illustrate techniques to define rules to prevent unauthorized access to files, programs, and objects, according to various embodiments.

DETAILED DESCRIPTION

Embodiments disclosed herein provide protected environmental controls to secure data and applications in computing systems. The protected environmental controls provide an additional layer of security that must be met before the system provides access to requested data and/or applications. Doing so prevents any user, including users with complete access to the system (e.g., a system administrator, "superuser," or "root" level user), from gaining improper access to data and/or applications.

When an operating system (OS) is installed on a system (which may be a physical or virtualized system), a trusted user account is created, and biometric information of the person associated with the trusted user account is received. The trusted user account details (e.g., username and password) and biometric information (e.g., a fingerprint and/or iris scan) is then stored in protected memory blocks. The protected memory is only accessible by privileged components of the OS and/or the microcode of the system. Creation of a trusted user account is permitted during install of the OS. Subsequently, the trusted user, after being authenticated via the account details and biometric information, defines environmental rules that must be met to access a given file, application, and/or any other type of data on the system. The environmental rules are stored in the protected memory blocks accessible by privileged components of the OS and/or the microcode of the system. If the trusted user is not authenticated via the biometric information and a correct username and password combination, the rules cannot be defined, viewed, or otherwise modified.

For example, once the OS is installed, the trusted user may provide the account details and biometric information, and define a rule specifying that a file (or application, object, or any other data on the system) is accessible by statement number 33 of program X which is executed by user Y. When a subsequent attempt to access the file is made (e.g., by an application), the OS and/or microcode of the system analyze collected environmental parameters describing the attempted access. The collected environmental parameters may include, without limitation, an indication of the application currently on the program stack which made the call to access the file, the statement number of the application on the program stack, and the user executing the application. If, for example, the collected environmental parameters specify that the attempted access to the file was made by statement 100 of program X executed by user Y, the request to access the file is rejected, as the statement number 100 does not match the statement number of 33 specified in the rule. Similarly, if the collected environmental parameters indicate that application Z requested to access the file, and/or an application executed by user A requested to access the file, the request to access the file is rejected.

Figure 1:
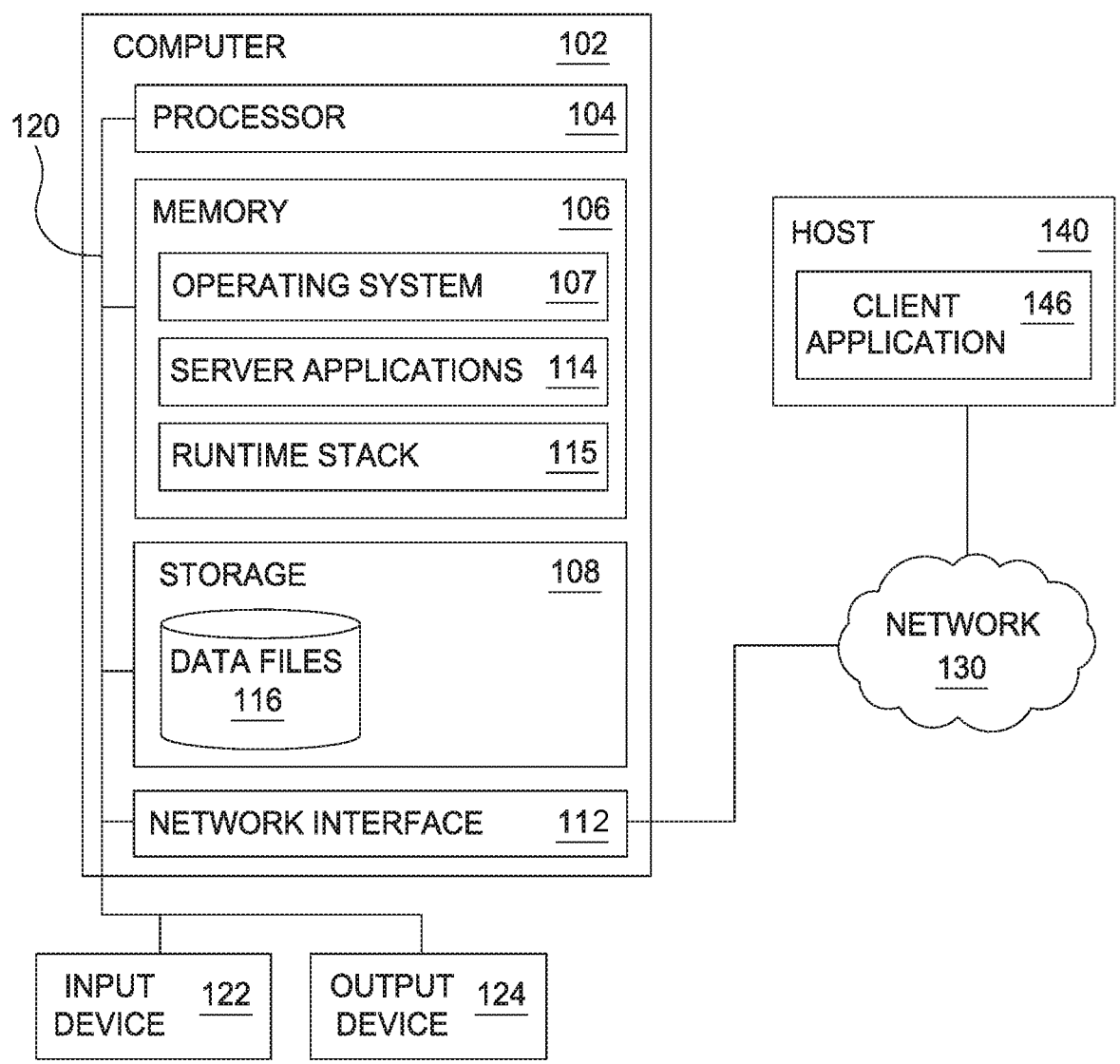
FIG. 1 illustrates an example computing environment which leverages environmental security controls to prevent unauthorized access to files, programs, and objects, according to one embodiment.

FIG. 1 illustrates an example computing environment 100 which leverages environmental security controls to prevent unauthorized access to files, programs, and objects, according to one embodiment. The computing environment 100 includes a computer 102. The computer 102 may also be connected to other computers (e.g. hosts) via a network 130.

The computer 102 generally includes a processor 104 which obtains instructions and data via a bus 120 from a memory 106 and/or storage 108. The computer 102 may also include one or more input device(s) 122 and/or output device(s) 124 connected to the bus 120. The computer 102 is generally under the control of an operating system 107. Examples of operating systems include the IBM i operating system, UNIX operating system, the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is a programmable logic device that performs instruction, logic, and mathematical processing, and may be representative of one or more CPUs. The processor may execute one or more server applications 114 in memory 106. In at least one embodiment, the OS 107 allocates each program executing on the computer 102 a respective runtime stack 115. The network interface 112 may be any type of network communications device allowing the computer 102 to communicate with other computers via the network 130. The network interface 112 may exchange messages with the network 130.

The storage 108 is representative of hard-disk drives, solid state drives, flash memory devices, optical media, and the like. Storage 108 may also include structured storage, for example a database. In addition, the memory 106 and the storage 108 may be considered to include memory physically located elsewhere; for example, on another computer coupled to the computer 102 via the bus 120 or network 130.

Furthermore, the computer 102 may be one or more servers operating as a part of a server cluster. For example, computer 102 may operate as an application server and may communicate with or in conjunction with other frontend, application, backend, data repository, or other type of server.

As shown, the memory 106 includes at least one runtime stack 115. Generally, a runtime stack (also referred to as a call stack) is a stack data structure that stores information about the active subroutines of a program (e.g., a server application 114), as well as calls made by the program to other programs and interfaces, such as application programming interfaces (APIs) or system calls.

As shown, the storage 108 includes a store of data files 116. The data files 116 are representative of any type of data, including, without limitation, applications (e.g., the executable files of the server applications 114), programs, files, and any other type of data object. Generally, the data files 116 each have a respective set of access permissions. For example, in many operating systems, each file and directory has a set of permissions such as read, write, and execute permissions. Each file and directory is associated with a set of user-based permissions which control what permissions a particular user, or group of users, or applications have. For example, a particular user may have read-only permissions on one file in the data files 116 and read/write permissions on another file in the data files 116. Furthermore, an application, such as server application 114, has files not only in a dedicated directory, but may also have files in system, shared, or user directories scattered throughout a file system. As such, each application has a respective set of access permissions for accessing the data files 116. For example, a given server application 114 may have read-only access to all of the files in a first directory, but read/write access to all of the files in a second directory.

However, in some embodiments, an application, executing in the context of an executing user, derives permissions from the user-level permissions of the executing user. As such, for example, the application may use the derived permissions to open a file for read access. Furthermore, the application may be able to elevate its authority, i.e., the application may be able to assert another set of permissions other than those permission derived from the user's permissions. For example, the setuid utility in Linux, allows an application to assert the authority of the owner of the application rather than the user. By asserting the authority of an entity other than the user, the application may be able to access files that the user otherwise would not be able to access. Using this elevated authority, the application is able to open the file for read/write access even though the user does not have read/write permissions on the file.

The hosts 140 are compute nodes configured to execute one or more client applications 146. Generally, client applications 146 may be deployed in any suitable configuration. For example, client applications 146 may execute on computer 102 as a process, or within the context of a virtual machine executing on computer 102. As another example, multiple client applications 146 may execute on a single compute node, separate from computer 102. As shown, client applications 146 execute on multiple hosts 140, which are separate from computer 102. The client applications 146 may communicate, via the network 120, with the server applications 114.

Figure 2:
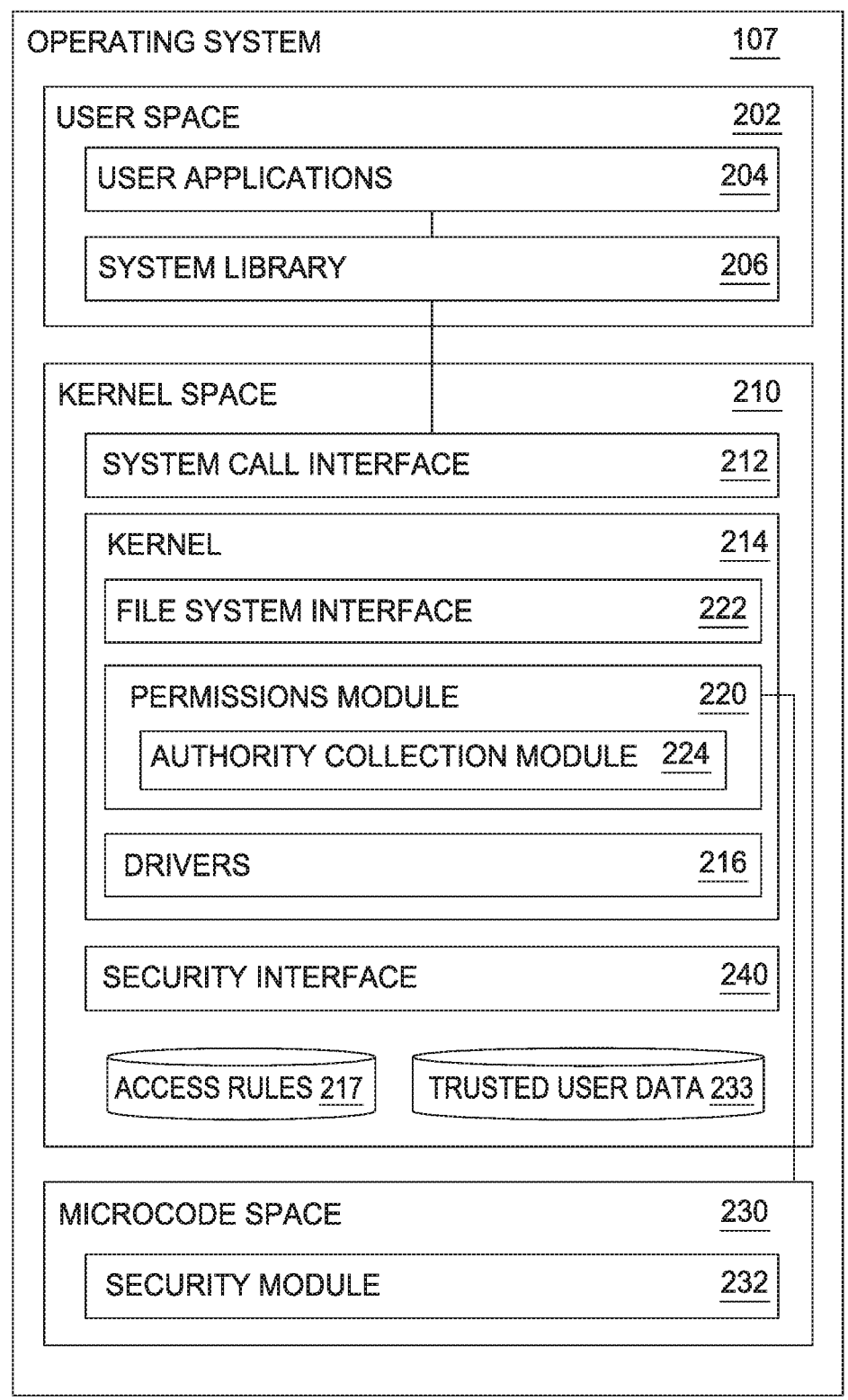
FIG. 2 illustrates components of an example operating system, according to one embodiment.

FIG. 2 illustrates components of the operating system 107, according to one embodiment. As discussed above, the computer 102 is generally under the control of the operating system 107, which acts as an intermediary between computer hardware and provides a set of common services for software applications, including server and client applications. One service provided by the operating system 107 includes security services via file permissions. A software user application 204, such as a client or server application, may execute in a user space 202 of the operating system 207. The user application 204, executing in the context of a first user, may call into a system library 206, such as an API or C library, requesting access to one or more files (e.g., in the memory 106 and/or the data files 116). The system library 206 may then make a system call to a system call interface 212. The user application 204 may also directly make system calls to the system call interface 212. The system call interface 212, executing in kernel space 210, processes the system call.

Kernel space 210 is a protected address space in memory in which core operating system operations, such as processing input/output (I/O) requests, managing memory, etc., are executed. Generally, kernel space 210 is reserved for executing an operating system kernel 214, any installed kernel extensions (not shown) and device drivers 216. In contrast, user space 202 is address space in memory (separate from kernel space 210) used to execute applications 204, a graphical user interface (GUI, not pictured), and system libraries 206. Each instance of a computer program executing in user space 202 is generally executed within its own virtual memory address space in the context of the user executing the program. Programs executing in user space 202 generally cannot access the virtual memory space of other programs without passing access requests through the kernel via the system library 206. Kernel programs executing in kernel space 210 generally have full memory access.

For example, in accessing a file, an application may invoke a system call, such as access( ) of the system library 206, passing in an indication of what type of access is sought, such as read or read/write access. The system library 206 then calls into the system call interface 212 executing in kernel space 210. The system call interface 212 may call into a permissions module 220 of the kernel 214 to determine whether the application has sufficient permissions to access the file. The permissions module 220 may base the permissions determination on, for example, the calling process' real authority based on the user authority, or the calling process' elevated authority, if available.

Generally, the kernel 214 manages access to I/O devices, including access to the file system and storage, as allowing direct application access to I/O device ports and controllers may cause system instabilities due to a misbehaving single application. As a part of managing access to the I/O device, the kernel 214 generally, determines whether to allow the application to perform file operations on the file based on the authority of the application, such as the user, group, or other authority, and the permissions on the file, and this determination may be made by the file permission check module 220 of the kernel 214. The permissions module 220 obtains the application's real or elevated authority and accesses file permissions information to perform functions necessary to verify that the application 204 has sufficient permissions to access the file.

The permissions module 220 obtains the application's real or elevated authority and accesses file permissions information to perform functions necessary to verify that the application 204 has sufficient permissions to access the file. For example, the permissions module 220 may interface with the file system interface 222 to access the file. The file system interface checks the file system and returns the file permissions. File permissions are stored with the file in a file system (e.g., new technology file system (NTFS), extended file system (ext, ext2-ext4), library based file system, database based file systems). For example, Unix style file permissions may be stored as 9 bits of information along with the file indicating which three actions (read, write, and execute) may be performed by which three groups (user, group, other). The permissions module 220 interprets these information bits to determine permissions to the file. Additionally, the file system may support access control lists (ACL) which may support assigning actions to more than one user or group for each file. ACLs are also stored in the file system.

Generally, permissions for a file in the data files 116 are checked whenever there is an action performed on the file. For example, if a file is opened for reading, the permissions module 220 performs a check to verify the user has read permissions on the file. Where the user then performs an edit on the file the application may then open the file for read/write access. If the file is then re-opened for read/write, even during the same application instance, the permissions module 220 performs another check on the file permissions. The permissions module 220 performs another permissions check when the file is actually being written to, such as during a save.

In checking the permissions on a file, the permissions module 220 obtains file permissions information. This information may be passed along to an authority collection module 224 invoked by, or contained within, the permissions module 220. This information may pertain to, for example, details of the permissions available to the user, along with permissions available to any groups or ACLs associated with the user, permissions obtained from an executable asserting elevated privileges, permissions required by the file, time information, system object information, whether an authority check is successful, and other such information useful for checking whether a user has sufficient permissions to access a file. As the authority collection module 224 may collect information related to each permissions check, the authority collection module 224 may determine the permissions requested by an application, along with the permissions actually used by the application. Generally, the information collected by the authority collection module 224 includes identifying information of the requested file, the location of the file, users involved in the request (e.g., process user and groups), the authority required to access the file, what authorization list secures the file, all program adopted authority (e.g., elevated privileges), and information related to the current environment such as job names and numbers, and the like.

The authority collection module 224 may further obtain information from an application's runtime stack 115, which may detail each active subroutine of a program as well as calls by the program to other programs and interfaces, such as API or system calls. The runtime stack 115 may further include a statement number of the most recent program (or application) on the runtime stack 115, and a statement number of the most recent running user application 204 on the runtime stack 115. As such, the authority collection module 224 is able to identify the actual program statement number being executed which specifies to access a file in some way, and invokes the permissions module 220 to perform a permissions check. The permissions module 220 may use the information collected by the authority collection module 224 from the runtime stack 115 when performing the file permissions check. If the information gathered by the authority collection module 224 does not satisfy a rule for accessing a file in the access rules 217, the permissions module 220 denies the request to access the file. For example, a first rule in the access rules 217 may specify that file "sensitive1" can only be accessed by statement 345 of program P1 executed by user "FRED1." When a request is subsequently received to access file "sensitive1", the authority collection module 224 collects metadata describing the access. For example, the authority collection module 224 determines that statement 123 of program P1 executed by user "FRED1" seeks to access the "sensitive1" file. The permissions module 220 may then compare the attributes collected by the authority collection module 224 to the first rule, and determine to deny the requested access to the file because the statement number 123 does not match the statement number of 245 specified in the rule. Advantageously, however, the permissions module 220 does not reveal the reason why the access was denied.

The authority collection module 224 may be configured, for example via a command line command or a graphical user interface, to obtain and log information related to a file permissions check. This logging may be configurable. For example, the authority collection module 224 may be configured to log every request for a file permissions check as well as the results of the check for a particular user. In addition, other configurations may be supported, such as for multiple users, specific types of files, or based on specific file permissions sought. The logged information may be stored in a file of the file system, for example, as a data file or database file. Logging, via the authority collection module 224 may be performed over a period of time, observing the files access by users in the ordinary course of activities on the computer. This logged file may be accessible, like other files, by an administrator or user to view and analyze using other tools, such as a database view tool.

As shown, a protected microcode space 230 is provided, which may be physically separate from hardware used to store and execute the user space 202 and kernel space 210. For example, the microcode space 230 may execute on a service processor or processor subsystem that interfaces with and manages another processor or other portions of a processor. The microcode space 230 provides a protected memory and execution space separate from both the user space 202 and kernel space 210 which kernel programs may call into while performing certain functions. The permissions module 220 may call into, for example, a security module 232 executing in the microcode space 230 to gather the file permissions information. Generally, authority collection of the file permissions may be performed in the same context in which file permissions are obtained. Where file permissions information is obtained in microcode, authority collection and authority adjustment may be performed, at least in part, in microcode space 230. For example, interfaces for beginning and ending authority collection and logging may be implemented in the OS kernel space 210 or user space 202, while data collection itself may be performed in microcode space 230.

As shown, the operating system 107 includes a security interface 240. The security interface 240 is configured to receive input specifying metadata of a trusted user account during installation of the operating system 107. For example, the metadata of the trusted user may include a username (e.g., "FRED1"), a password, and at least one additional security parameter. The additional security parameter may include a biometric identifier (e.g., a fingerprint, iris scan, voice data, and the like) and/or a smartcard identifier. The metadata describing the trusted user is then stored in the trusted user data 233, which is stored in a protected block of memory (or the microcode space 230). Once defined (which occurs during install of the operating system 107), the metadata describing the trusted user data 233 can only be modified by providing the credentials and biometric identifier of the trusted user. For example, if user FRED1 is no longer the trusted user, user FRED1 would need to log into an interface provided by the security interface 240 to define a different user (e.g., BOB1) as the trusted user, who would then provide credentials and a biometric identifier.

Once the trusted user data 233 is stored, the person associated with the trusted user account can define one or more rules for accessing files (e.g., programs, files, and data objects in the data files 116) in the access rules 217. To define or otherwise modify a rule in the access rules 217, a username, password, and biometric identifier (or smartcard) matching the information stored in the trusted user data 233 must be presented. In one embodiment, the rules are defined via an interface provided by the security interface 240, described in greater detail below with reference to FIG. 3B. The access rules 217 are also stored in a protected block of memory and/or the microcode space 230. As such, a user cannot view or modify the access rules 217 without the required credentials, including the biometric identifier of the trusted user. Advantageously, because the details of the access rules 217 cannot be accessed by unauthorized users, applications cannot be modified to satisfy the access rules 217 (e.g., by changing application code such that the statement number which requests access to a file matches the statement number in the access rules 217).

According to aspects of the present disclosure, architecture of the operating system 107 and how an authority collection process is implemented influences the amount and type of information available for collection as file permission information may be treated as privileged information by the operating system 107. For example, the operating system 107 may partition execution of programs executing in user space 202 such that they cannot access information related to other programs, such as a request for a file, without cooperation between multiple programs. Where such cooperation is not available, such as between legacy or third party programs, requests for access to or from another program may be passed along to the OS 107 itself. However, some operating systems may not support user space programs obtaining information related to file access by another program without a certain level of corporation between the programs. File permissions information available to applications executing solely in user space 202 thus may be much less detailed than can be obtained where the authority collection is integrated to some degree in the OS kernel 214.

FIG. 3A is a chart view of an example file permissions check log 300, according to one embodiment disclosed herein. As shown, the file permissions check log 300 depicts a portion of information collected and logged by the authority collection module 224 of FIG. 2 based on requests for access to several files and objects. The view is based on database query on the log and contains information related to multiple files and objects. Information related to a specific file may be identified and displayed by other database queries. Here, the file permissions check log includes columns of information pertaining a requesting username 301, a name of the system object placing the call 302, a name of the library making the call 303, a type of the requested object 304, a most recent user program 305 on the runtime stack 115 invoking the system call, a statement number 306 of the most recent user program 305 on the runtime stack invoking the system call, a most recent program 307 on the runtime stack 115, and a statement number 308 of the most recent program on the runtime stack 115. The statement numbers 306, 308 correspond to the numbers of machine-level code statements generated by compiling higher-level source code.

As discussed above, information in the file permissions check log 300 is obtained by the authority collection module 224 during a file permission check performed by the permissions module 220, classifying and logging the obtained information. The information in the log 300 also includes information obtained by the authority collection module 224 from the runtime stack 115 when a file permission check is requested. Again, the runtime stack 115 may contain information related to the active subroutines of the application, including names of any additional applications called, names of calling and called subroutines, statement numbers of calling and called subroutines, timestamps of calls, order in which applications are called, whether a particular called application invoked elevated authority, and other runtime execution environment information related to the application, similar to information that may be available to a debugging development environment. The authority collection module 224 may parse the runtime stack, classifying and logging the information in the stack.

Figure 3B:
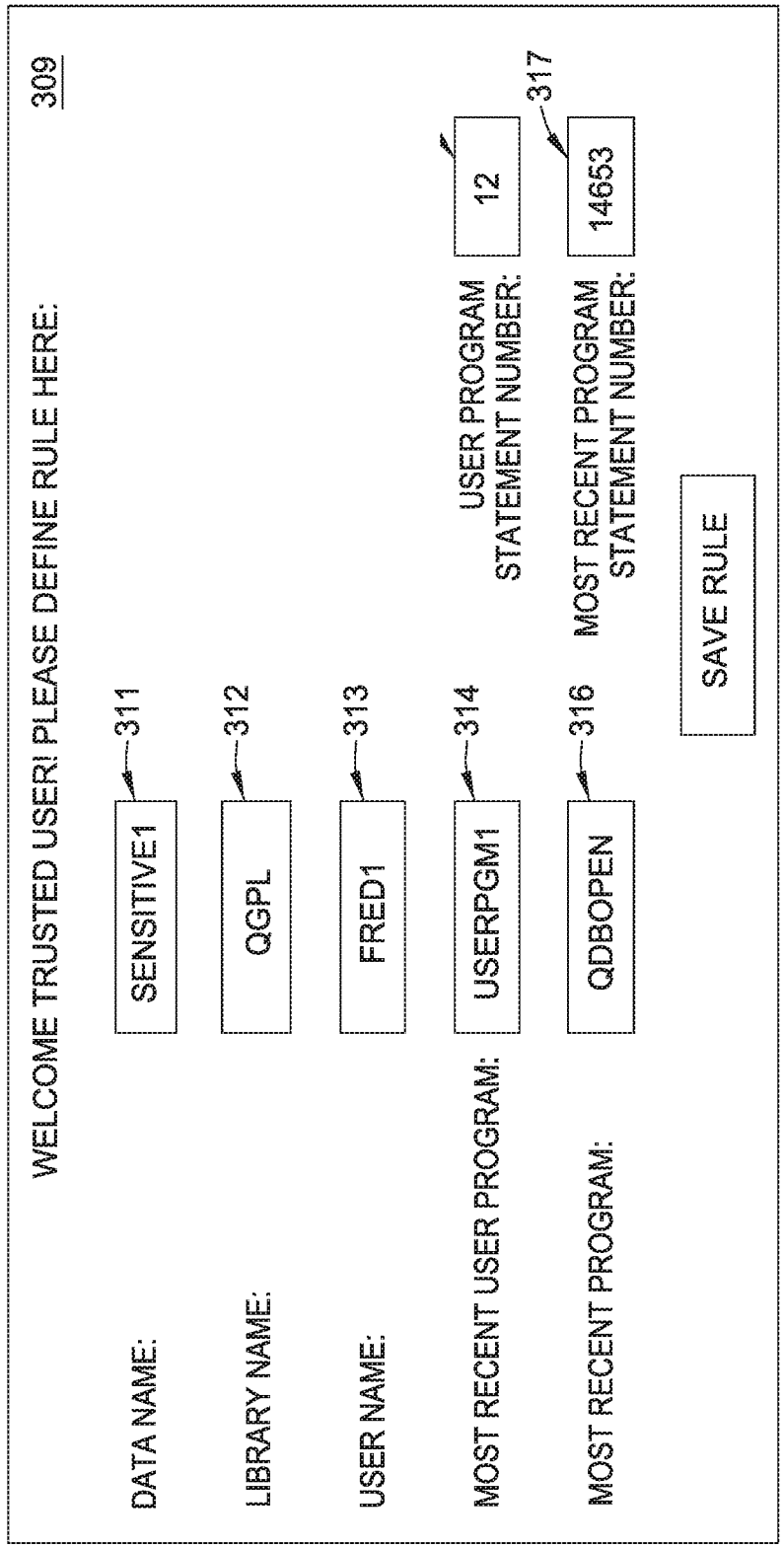

FIG. 3B illustrates an example graphical user interface 309 which allows a trusted user to define a rule for storage in the access rules 317, according to one embodiment. Prior to accessing the GUI 309, the credentials of the trusted user stored in the trusted user data 233 must be verified. Therefore, in at least one embodiment, the username, password, and biometric identifier stored in the trusted user data 233 must be provided. As shown, the GUI 309 includes example fields 311-317. Field 311 corresponds to the name of a data file 116, such as an executable, data file, script, and the like. For example, as shown, the name in field 311 is "sensitive1" which corresponds to one of the object names 302 from the log 300 of FIG. 3A. Field 312 corresponds to a library name making the system call to access the data file specified in field 311, such as "QGPL" from column 303 of the log 300. Field 313 corresponds to a username executing the program which requests access to the data file, such as "FRED1" from column 301 of FIG. 3A. Field 314 corresponds to the most recent user program on the runtime stack 115, which may correspond to one of the programs listed in column 305 of the log 300. Field 315 corresponds to a statement number of the most recent user program that made the call to access the file, such as statement number 12 from column 306 of the log 300. Field 316 corresponds to the most recent program on the runtime stack 115, such as "QDBOPEN" from column 307 of the log 300. Field 317 corresponds to the statement number of the most recent program on the runtime stack, such as "14653" from column 308 of the log 300. In some embodiments, the GUI 309 includes additional fields, such as group profile name, adopting program name, adopting program name statement number.

Once saved to the access rules 317, the permissions module 220 (and/or the security module 232) ensures that subsequent accesses to the data file specified in field 311 satisfy each of the parameters specified in fields 312-317. The permissions module 220, subsequent to receiving a request to access the data file, determines whether the data describing the access request obtained by the authority collection module 224 (e.g., data corresponding to the data in the log 300), satisfies each parameter specified in fields 312-317. If the data collected by the authority collection module 224 satisfies each element of the rule (e.g., each of the parameter values in fields 312-317), in addition to conventional access security controls, the permissions module 220 permits access to the file. However, if one or more of the parameter values in the fields 312-317 are not satisfied by the data collected by the authority collection module 224, the permissions module 220 rejects the request to access the file. For example, if a program executed by user "FRED2" attempts to access the file sensitive1, the request is denied, and access to the file is not permitted. Similarly, if the statement number of the most recent user program on the runtime stack 115 is 45 (and not the required statement number of 12), the permissions module 220 denies access to the file sensitive1.

Advantageously, however, the permissions module 220 does not report the reasons why access to a file is denied. Therefore, a rogue user has no way of determining the parameters of a given rule to change an application to meet the parameters of the rule (e.g., to cause USERPGM1 to access the file sensitive1 using statement number 12). Furthermore, because the rules in the access rules 117 are only accessible by the trusted user using multi-factor authentication, users who gain root level access are not able to define new rules or otherwise view or modify existing rules in the access rules 117.

In at least one embodiment, the security interface 240 provides the GUI 309, and populates the GUI 309 with values for the example fields 311-317 based on data stored in the log 300. For example, if the security interface 240 identifies multiple calls to "sensitive1" in the log 300, the security interface 240 may pre-populate the GUI 309 with information corresponding to the file "sensitive1", such as the program making the greatest number of calls to the file, the statement number of the program making the greatest number of calls to the file, and the like. Doing so allows the trusted user to more easily define rules for storage in the access rules 217. Furthermore, the rules in the access rules 217 may include rules to allow normal operations by the operating system 107 to system files. For example, the security interface 240 may populate the GUI 309 with parameters for rules to permit tasks such as file backups (with corresponding statement numbers). As another example, rules may be defined for interfaces which grant, revoke, and/or change ownership of a file, where the statement numbers and other details of the corresponding interfaces are pre-populated in the GUI 309, and the trusted user defines the users who are able to perform these functions on the files.

Further still, the security interface 240 may provide interfaces to the trusted user allowing the trusted user to modify or delete rules. Doing so allows the trusted user to update the rule parameters when, for example, the code of an application changes, and a different statement number attempts to access a file. The trusted user may then update the statement number in the access rules 217 to match the new statement number.

Figure 4:
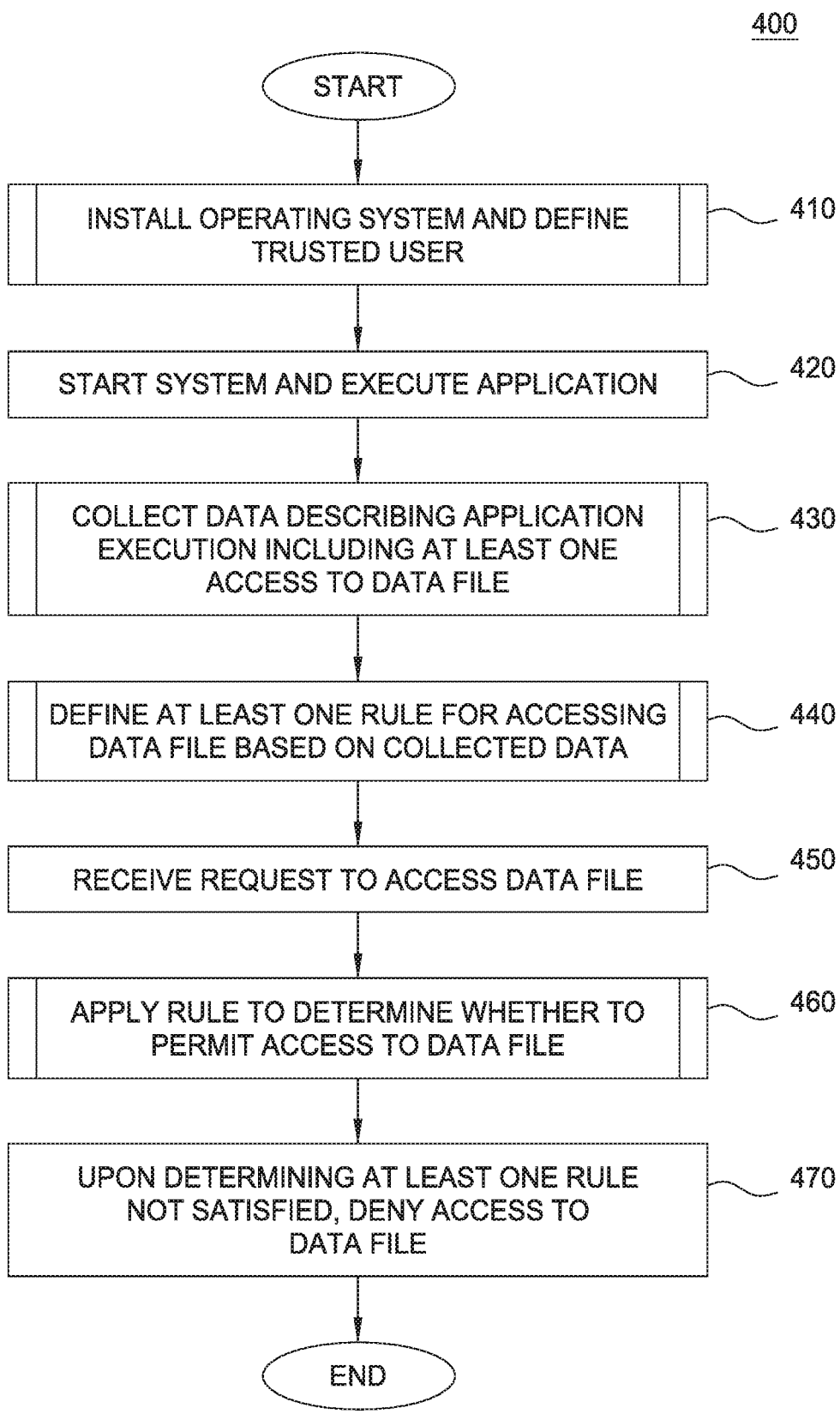
FIG. 4 is a flow chart illustrating an example method to leverage environmental security controls to prevent unauthorized access to files, programs, and objects, according to one embodiment.

FIG. 4 is a flow chart illustrating an example method 400 to leverage environmental security controls to prevent unauthorized access to files, programs, and objects, according to one embodiment. As shown, the method 400 begins at block 410, described in greater detail with reference to FIG. 5, where the operating system 107 of a physical and/or virtualized system is installed, and the trusted user is defined. Generally, a username, password, and additional authentication factor (e.g., a biometric identifier) is defined for the trusted user and stored in the trusted user data 233 at block 410. At block 420, the system is started and one or more applications begin executing on the system. At block 430, described in greater detail with reference to FIG. 6, the authority collection module 224 collects data describing the execution of each of the applications, which includes at least one access to a data file 116 (e.g., a file, application, object, etc.). Generally, at block 430, the authority collection module 224 collects at least the types of parameters depicted in FIG. 3A, and stores the data in the log 300.

At block 440, described in greater detail with reference to FIG. 7, the trusted user defines at least one rule for accessing at least one file based on the data collected by the authority collection module. In at least one embodiment, the at least one rule includes information from the runtime stack 115, such specifying the names and statement numbers of the most recent application and most recent user application on the runtime stack 115. At block 450, the permissions module 220 (and/or the security module 232) receives a request to access a file in the data files 116. At block 460, the permissions module 220 (and/or the security module 232) applies at least one rule for accessing the requested file in the access rules 217 to determine whether to permit the requested access to the data file. At block 470, the permissions module 220 (and/or the security module 232) denies access to the requested data file upon determining at least one rule (or a component thereof) in the access rules 217 is not satisfied. For example, if the most recent program statement number does not match the most recent program statement number specified in the rule associated with the requested data file in the access rules 217, the permissions module 220 (and/or the security module 232) rejects the request to access the data file. However, if all of the rules (and conventional permissions checks) are satisfied, the permissions module 220 (and/or the security module 232) permits the requested access to the data file.

Figure 5:
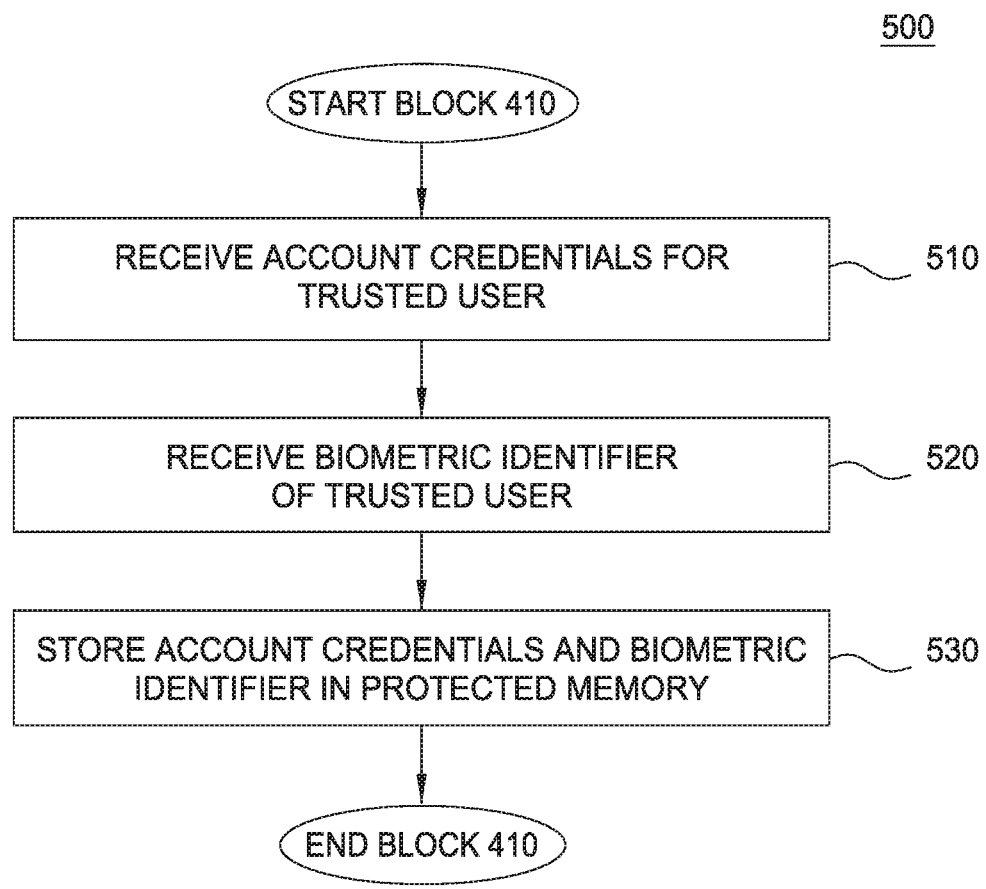
FIG. 5 is a flow chart illustrating an example method to install an operating system and define a trusted user, according to one embodiment.

FIG. 5 is a flow chart illustrating an example method 500 corresponding to block 410 to install an operating system and define a trusted user, according to one embodiment. As previously indicated, the trusted user is defined during the installation of the operating system 107. As shown, the method 500 begins at block 510, where the user provides account credentials for the trusted user. Generally, the account credentials include at least a username and a password. The username may be associated with any type of user account, and need not be a user account that has administrative rights (e.g., root level access). At block 520, the trusted user provides a biometric identifier, such as a fingerprint, iris scan, voice sample, and the like. A digital representation of the provided biometric identifier may then be generated. At block 530, the account credentials and biometric identifier are stored in the trusted user data 333, e.g., in a protected block of memory.

Figure 6:
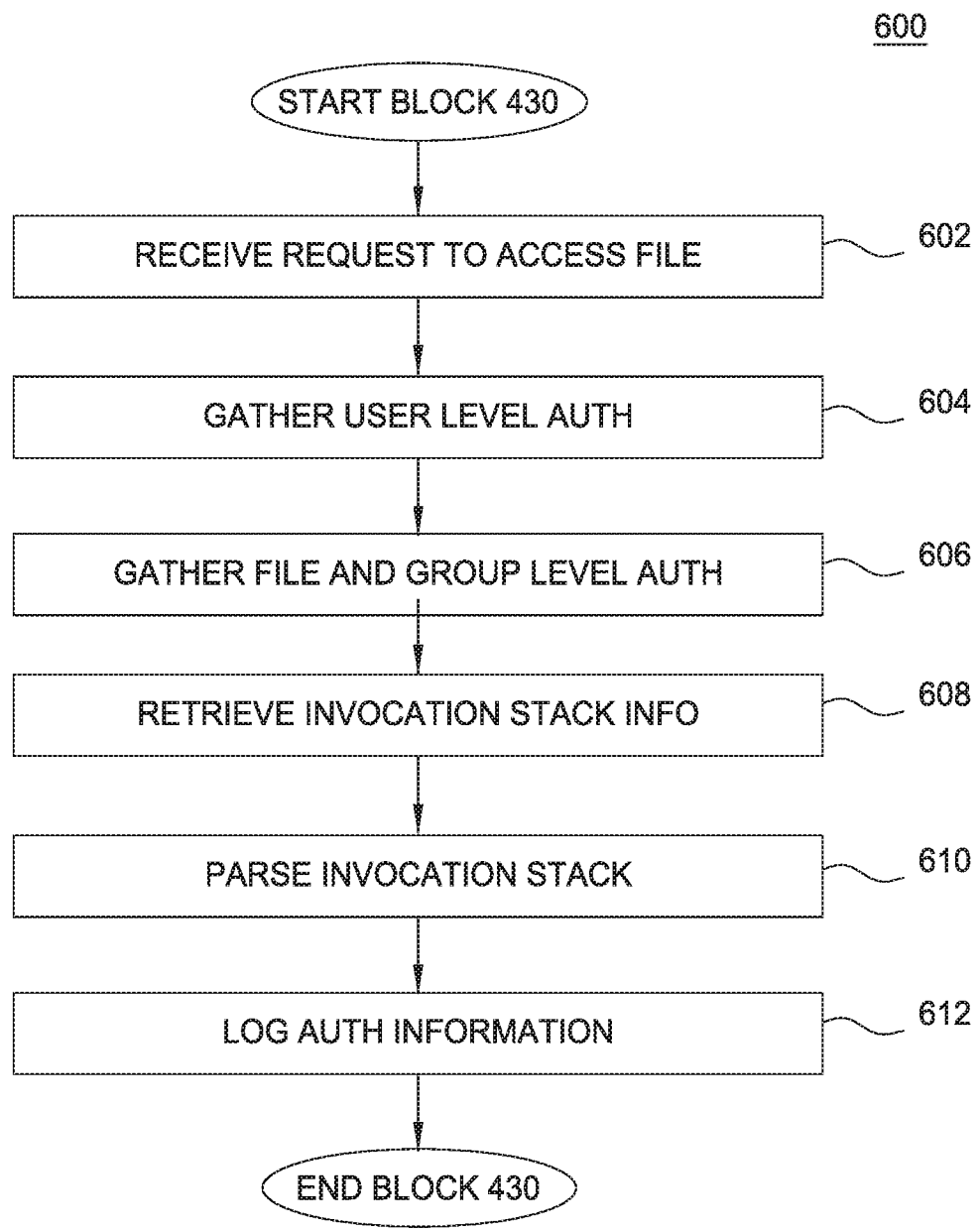
FIG. 6 is a flow chart illustrating an example method to collect data describing application execution, according to one embodiment.

FIG. 6 is a flow chart illustrating an example method 600 corresponding to block 430 to collect data describing application execution, according to one embodiment. FIG. 6 is a flow chart illustrating a method 600 for collecting authority information, in accordance with aspects of the present disclosure. As shown, the method begins at block 602 when an application requests access to a file. In response, the authority collection module 224, via the file permissions check module 220, receives an indication of the identity of the file, the location of the file, the type of access requested (e.g., read/write/execute) along with user level identity information, such the process user and groups to which the process user is a member of. This user level identity information and permissions associated with the identity may be gathered by the authority collection module 224 at block 604 for a particular file and file location. The file permissions check module 220 may also obtain permissions information related to the file, such as the authority required by the system to access the file, users and groups current authority to the file, and ACL lists for the file. This file and group permissions information may be gathered by the authority collection module 224 at block 606 for a particular file and file location.

At block 608, the authority collection module 224 retrieves a runtime stack 115 of the application requesting access to the file as well as information related to the runtime execution environment, such as job names, IDs, etc. Retrieving the runtime stack 115 enables access to detailed information related the execution environment as well as information related to the application requesting access to the file. For example, the runtime stack may contain detailed information related to the runtime execution environment, such as information related to active calls made by the application, including names of any additional applications called, names of calling and called subroutines, statement numbers of calling and called subroutines, order in which applications are called, whether a particular called application invoked elevated authority, thread information, job information, and other runtime execution environment information related to the application. At block 610, the authority collection module 224 parses the runtime stack 115, identifying, for example, programs on the runtime stack 115, program statement numbers invoked at each level of the runtime stack, system object call, job and thread information for the runtime environment. The parsing may, for example, be performed by looking at variable information passed into the system call, along with information related to returning to the subroutine when processing a particular call is finished, as well as environment information from a runtime context for the call.

The authority collection 224 module may also determine whether elevated privileges were asserted and if so, what privileges those elevated privileges comprise. This determination may be based on, for example, the runtime stack 115, or by monitoring for privilege elevation requests. For example, the runtime stack 115 may contain runtime execution environment information indicating what authority a particular application is invoking when the particular application makes a call to another application, a system call, or for each call. The authority collection module 224 may gather identification information related to the executable asserting elevated privileges, including name and location of the executable, module, procedure name, and statement number within the executable requesting access to the file, and an indication as to whether the elevated privileges are used to access the file.

At block 612, the gathered and parsed information is logged to an authority collection data file (e.g., the log 300) or OS control block for each file access request. This logging may be, for example, to a data file or to a database file.

Figure 7:
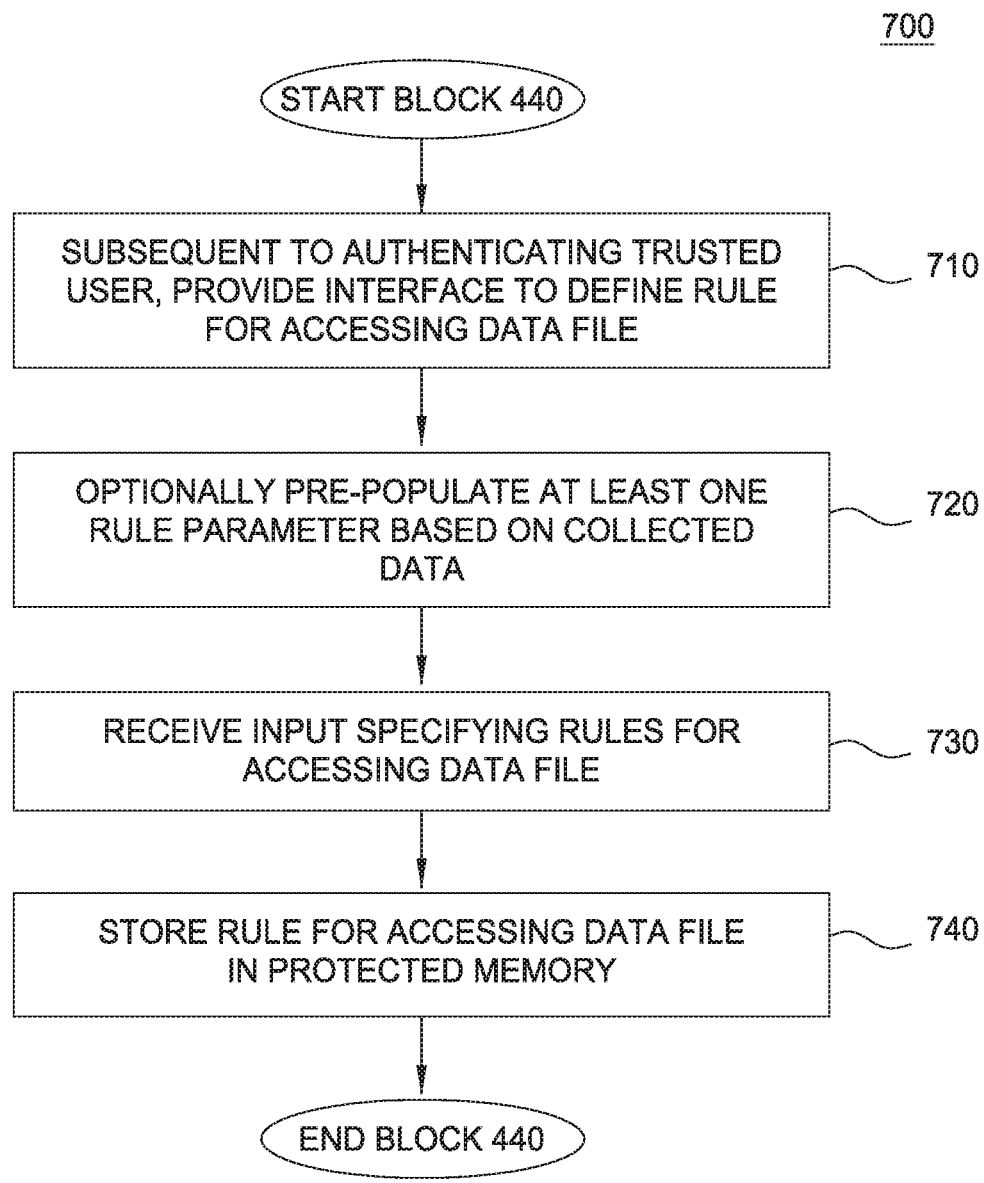
FIG. 7 is a flow chart illustrating an example method to define at least one rule, according to one embodiment.

FIG. 7 is a flow chart illustrating an example method 700 corresponding to block 440 to define at least one rule, according to one embodiment. As shown, the method 700 begins at block 710, where an interface, such as the GUI 309 of FIG. 3B, is provided to define a rule for accessing a data file after the trusted user is authenticated. In at least one embodiment, authenticating the trusted user includes receiving the correct login credentials of the user (e.g., username and password), as well as at least one other authentication factor (e.g., a biometric identifier or smartcard). If the user is not authenticated (e.g., a provided fingerprint does not match a fingerprint associated with the trusted user in the trusted user data 233), the interface is not provided to the user, as only the authenticated trusted user can view, create, or otherwise modify the access rules 217. At block 720, at least one rule parameter is pre-populated in the GUI. For example, the GUI 309 may be pre-populated with the most frequently occurring program statement numbers based on the data collected by the authority collection module 224. At block 730, the trusted user provides input specifying rules for accessing a given data file 116. At block 740, the rules for accessing the data file are stored in the access rules 217 in a protected block of memory. The rules in the access rules 217 are associated with a given file in the data files 116, thereby allowing the permissions check module 220 to identify the rules associated with a requested file.

Figure 8:
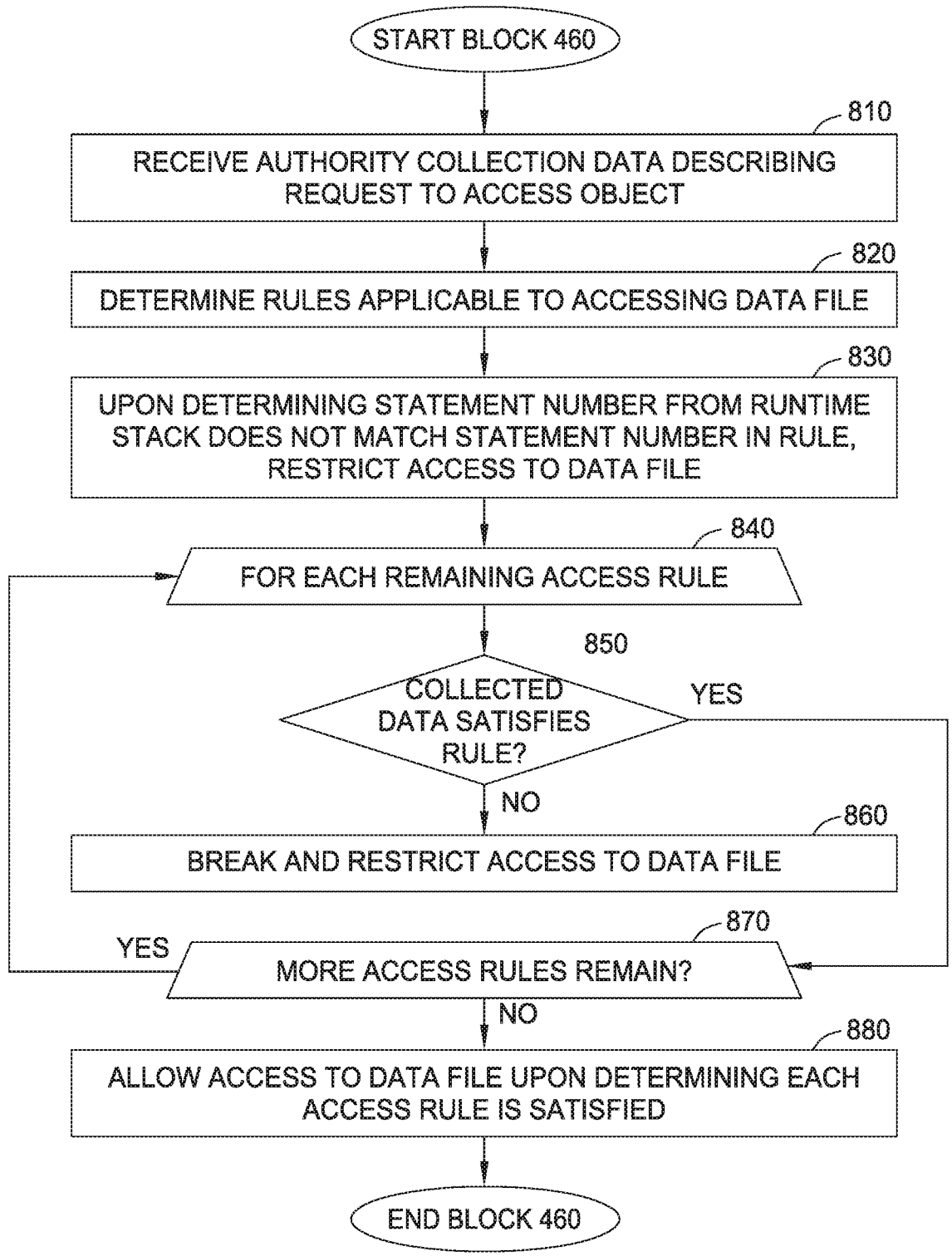
FIG. 8 is a flow chart illustrating an example method to apply a rule to determine whether to permit access to files, programs, and objects, according to one embodiment.

FIG. 8 is a flow chart illustrating an example method 800 corresponding to block 460 to apply a rule to determine whether to permit access to files, programs, and objects, according to one embodiment. Generally, the permissions module 220 and/or the security module 232 may execute the method 800. As shown, the method 800 begins at block 810, where permissions module 220 receives the data collected by the authority collection module 224 describing the request to access the object. As previously indicated, the authority collection module 224, during information collection, captures information from the runtime stack 115 for the requesting process when the application requests access to the file. For example, the most recent user space application may be located on the runtime stack 115. Furthermore, the authority collection module 224 may also capture the name and location of the application, along with other forensic information, such as information identifying the procedure, module, or statement number making the request.

At block 820, the permissions module 220 determines one or more rules applicable to accessing the requested data file 116. Generally, at block 820, the permissions module 220 references the access rules 117 using an identifier (e.g., a filename, location, etc.) of the requested data file 116 to identify one or more rules. At block 830, the permissions module 220 restricts access to the data file upon determining the statement number(s) from the runtime stack 115 do not match the statement numbers in the access rule 117. As discussed above, the statement number may be for the most recent user program on the runtime stack 115 and/or the most recent program on the runtime stack 115. At block 840, the permissions module 220 executes a loop including blocks 850-870 for each remaining access rule for accessing the requested data file.

At block 850, the permissions module 220 determines whether the data collected by the authority collection module 224 satisfies the current rule. If the collected data satisfies the rule, the permissions module 220 proceeds to block 870, otherwise the permissions module 220 proceeds to block 860. For example, the access rule may specify that the data file can be accessed by a program executed by user "PETE." If the permissions module 220 determines that a program executed by user "SAM" is attempting to access the data file, the usernames do not match, and the permissions module 220 proceeds to block 860. At block 860, the permissions module 220 breaks and restricts the requested access to the data file. At block 870, the permissions module 220 determines whether more access rules remain. If more access rules remain, the permissions module 220 returns to block 840. Otherwise, the permissions module 220 proceeds to block 880, where the permissions module 220 permits access to the data file upon determining each access rule 217 is satisfied.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
receiving, from an application executing on a system, a request to access a data file;
receiving data describing the request, wherein the data describing the request includes data from a runtime stack;
determining, from the data from the runtime stack, (i) a most recent user application in the runtime stack, and (ii) first program statement number, wherein the first program statement number identifies a first machine-level code statement in compiled source code of the most recent user application, wherein the first machine-level code statement is currently being executed;
identifying, in a protected memory block, a first rule that corresponds to the data file, wherein the first rule defines permission to access the data file, and wherein the first rule specifies (i) a first authorized user application and (ii) a first authorized program statement number of the most recent user application, wherein the first authorized program statement number specifies a machine-level code statement in compiled source code of the first authorized user application;
upon determining that the first program statement number from the runtime stack does not match the first authorized program statement number specified in the first rule, restricting access to the data file by the application; and
upon restricting access to the data file, updating an access log to include an entry specifying (i) the most recent user application, (ii) the first program statement number, and (iii) an indication that access was restricted.

2. The method of claim 1, wherein the data from the runtime stack further includes an indication of: (i) a user executing the application, (ii) a most recent program in the runtime stack, wherein the most recent program is more recent than the most recent user application, (iii) a second program statement number of the most recent program in the runtime stack, and (iv) a system object call.

3. The method of claim 2, wherein a second rule specifies a user account permitted to execute the application, wherein a third rule specifies a permitted most recent program in the runtime stack, wherein a fourth rule specifies a statement number of the most recent program in the runtime stack permitted to access the data file, wherein a fifth rule specifies a permitted system object call, wherein the access to the data file is further restricted upon determining that the collected data does not satisfy at least one of the second, third, fourth, and fifth rules.

4. The method of claim 1, further comprising prior to receiving the request:
installing an operating system on the system; and
during installation of the operating system:
receiving login credentials and a biometric identifier of a trusted user; and
storing an indication of the login credentials and the biometric identifier in the protected memory block.

5. The method of claim 4, further comprising subsequent to storing the indication of the login credentials and the biometric identifier in the protected memory block:
receiving, from the trusted user, the login credentials and the biometric identifier;
authenticating the trusted user based on the login credentials and the biometric identifier;
generating a graphical user interface (GUI) for defining access rules;
receiving, by the graphical user interface, at least one parameter of the first rule, wherein the at least one parameter includes the first authorized program statement number of the machine-level code statement in the first authorized user application; and
storing the at least one parameter of the first rule in the protected memory block.

6. The method of claim 1, further comprising:
receiving, from the application, a second request to access a second data file;
receiving data describing the second request, wherein the data describing the second request includes data from the runtime stack of the application, wherein the data from the runtime stack includes a second program statement number associated with the second request; and
upon determining that the second program statement number from the runtime stack matches the first program statement number specified in the first rule, permitting access to the data file by the application.

7. The method of claim 1, wherein the access to the data file is restricted by at least one of: (i) an operating system, and (ii) a microcode of the system.

8. A computer program product, comprising:
a computer-readable storage medium having computer readable program code embodied therewith, the computer readable program code executable by a processor to perform an operation comprising:
receiving, from an application executing on a system, a request to access a data file;
receiving data describing the request, wherein the data describing the request includes data from a runtime stack;
determining, from the data from the runtime stack, (i) a most recent user application in the runtime stack, and (ii) first program statement number, wherein the first program statement number identifies a first machine-level code statement in compiled source code of the most recent user application, wherein the first machine-level code statement is currently being executed;
identifying, in a protected memory block, a first rule that corresponds to the data file, wherein the first rule defines permission to access the data file, and wherein the first rule specifies (i) a first authorized user application and (ii) a first authorized program statement number of the most recent user application, wherein the first authorized program statement number specifies a machine-level code statement in compiled source code of the first authorized user application;
upon determining that the first program statement number from the runtime stack does not match the first authorized program statement number specified in the first rule, restricting access to the data file by the application; and
upon restricting access to the data file, updating an access log to include an entry specifying (i) the most recent user application, (ii) the first program statement number, and (iii) an indication that access was restricted.

9. The computer program product of claim 8, wherein the data from the runtime stack further includes an indication of: (i) a user executing the application, (ii) a most recent program in the runtime stack, wherein the most recent program is more recent than the most recent user application, (iii) a second program statement number of the most recent program in the runtime stack, and (iv) a system object call.

10. The computer program product of claim 9, wherein a second rule specifies a user account permitted to execute the application, wherein a third rule specifies a permitted most recent program in the runtime stack, wherein a fourth rule specifies a statement number of the most recent program in the runtime stack permitted to access the data file, wherein a fifth rule specifies a permitted system object call, wherein the access to the data file is further restricted upon determining that the collected data does not satisfy at least one of the second, third, fourth, and fifth rules.

11. The computer program product of claim 8, the operation further comprising prior to receiving the request:
installing an operating system on the system; and
during installation of the operating system:
receiving login credentials and a biometric identifier of a trusted user; and
storing an indication of the login credentials and the biometric identifier in the protected memory block.

12. The computer program product of claim 11, the operation further comprising subsequent to storing the indication of the login credentials and the biometric identifier in the protected memory block:
receiving, from the trusted user, the login credentials and the biometric identifier;
authenticating the trusted user based on the login credentials and the biometric identifier;
generating a graphical user interface (GUI) for defining access rules;
receiving, by the graphical user interface, at least one parameter of the first rule, wherein the at least one parameter includes the first authorized program statement number of the machine-level code statement in the first authorized user application; and
storing the at least one parameter of the first rule in the protected memory block.

13. The computer program product of claim 8, the operation further comprising:
receiving, from the application, a second request to access a second data file;
receiving data describing the second request, wherein the data describing the second request includes data from the runtime stack of the application, wherein the data from the runtime stack includes a second program statement number associated with the second request; and
upon determining that the second program statement number from the runtime stack matches the first program statement number specified in the first rule, permitting access to the data file by the application.

14. The computer program product of claim 8, wherein the access to the data file is restricted by at least one of: (i) an operating system, and (ii) a microcode of the system.

15. A system, comprising:
a processor; and
a memory storing one or more instructions which, when executed by the processor, performs an operation comprising:
receiving, from an application executing on a system, a request to access a data file;
receiving data describing the request, wherein the data describing the request includes data from a runtime stack;
determining, from the data from the runtime stack, (i) a most recent user application in the runtime stack, and (ii) first program statement number, wherein the first program statement number identifies a first machine-level code statement in compiled source code of the most recent user application, wherein the first machine-level code statement is currently being executed;
identifying, in a protected memory block, a first rule that corresponds to the data file, wherein the first rule defines permission to access the data file, and wherein the first rule specifies (i) a first authorized user application and (ii) a first authorized program statement number of the most recent user application, wherein the first authorized program statement number specifies a machine-level code statement in compiled source code of the first authorized user application;
upon determining that the first program statement number from the runtime stack does not match the first authorized program statement number specified in the first rule, restricting access to the data file by the application; and
upon restricting access to the data file, updating an access log to include an entry specifying (i) the most recent user application, (ii) the first program statement number, and (iii) an indication that access was restricted.

16. The system of claim 15, wherein the data from the runtime stack further includes an indication of: (i) a user executing the application, (ii) a most recent program in the runtime stack, wherein the most recent program is more recent than the most recent user application, (iii) a second program statement number of the most recent program in the runtime stack, and (iv) a system object call.

17. The system of claim 16, wherein a second rule specifies a user account permitted to execute the application, wherein a third rule specifies a permitted most recent program in the runtime stack, wherein a fourth rule specifies a statement number of the most recent program in the runtime stack permitted to access the data file, wherein a fifth rule specifies a permitted system object call, wherein the access to the data file is further restricted upon determining that the collected data does not satisfy at least one of the second, third, fourth, and fifth rules.

18. The system of claim 15, the operation further comprising prior to receiving the request:
installing an operating system on the system; and
during installation of the operating system:
receiving login credentials and a biometric identifier of a trusted user; and
storing an indication of the login credentials and the biometric identifier in the protected memory block.

19. The system of claim 18, the operation further comprising subsequent to storing the indication of the login credentials and the biometric identifier in the protected memory block:
receiving, from the trusted user, the login credentials and the biometric identifier;
authenticating the trusted user based on the login credentials and the biometric identifier;
generating a graphical user interface (GUI) for defining access rules;
receiving, by the graphical user interface, at least one parameter of the first rule, wherein the at least one parameter includes the first authorized program statement number of the machine-level code statement in the first authorized user application; and storing the at least one parameter of the first rule in the protected memory block.

20. The system of claim 15, wherein the access to the data file is restricted by at least one of: (i) an operating system, and (ii) a microcode of the system, the operation further comprising:

receiving, from the application, a second request to access a second data file;

receiving data describing the second request, wherein the data describing the second request includes data from the runtime stack of the application, wherein the data from the runtime stack includes a second program statement number associated with the second request; and upon determining that the second program statement number from the runtime stack matches the first program statement number specified in the first rule, permitting access to the data file by the application.

* * * * *